US008843467B2

(12) United States Patent
Messer et al.

(10) Patent No.: US 8,843,467 B2
(45) Date of Patent: Sep. 23, 2014

(54) METHOD AND SYSTEM FOR PROVIDING RELEVANT INFORMATION TO A USER OF A DEVICE IN A LOCAL NETWORK

(75) Inventors: Alan Messer, Los Gatos, CA (US); Doreen Cheng, San Jose, CA (US); Anugeetha Kunjithapatham, Sunnyvale, CA (US); Mithun Sheshagiri, Berkeley, CA (US); Priyang Rathod, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 11/803,826

(22) Filed: May 15, 2007

(65) Prior Publication Data

US 2008/0288641 A1    Nov. 20, 2008

(51) Int. Cl.
*G06F 7/00*    (2006.01)
(52) U.S. Cl.
USPC ............................ 707/707; 709/226; 709/228
(58) Field of Classification Search
USPC ..................................... 709/226, 228; 707/10
See application file for complete search history.

(56) References Cited

U.S. PATENT DOCUMENTS

| 5,790,935 | A | 8/1998 | Payton |
| 5,974,406 | A | 10/1999 | Bisdikian et al. |
| 5,983,214 | A | 11/1999 | Lang et al. |
| 5,983,237 | A | 11/1999 | Jain et al. |
| 5,995,959 | A | 11/1999 | Friedman et al. |
| 6,151,603 | A | 11/2000 | Wolfe |
| 6,253,238 | B1 | 6/2001 | Lauder et al. |
| 6,334,127 | B1 | 12/2001 | Bieganski et al. |
| 6,412,073 | B1 | 6/2002 | Rangan |
| 6,438,579 | B1 | 8/2002 | Hosken |
| 6,480,844 | B1 | 11/2002 | Cortes et al. |
| 6,564,210 | B1 | 5/2003 | Korda et al. |
| 6,564,213 | B1 | 5/2003 | Ortega et al. |
| 6,637,028 | B1 | 10/2003 | Voyticky et al. |
| 6,665,658 | B1 | 12/2003 | DaCosta et al. |
| 6,721,748 | B1 | 4/2004 | Knight et al. |
| 6,766,523 | B2 | 7/2004 | Herley |

(Continued)

FOREIGN PATENT DOCUMENTS

| CN | 1393107 | 1/2003 |
| CN | 1723458 | 12/2003 |

(Continued)

OTHER PUBLICATIONS

Apple Inc., Apple iTunes, http://www.apple.com/itunes/, Apr. 28, 2003.

(Continued)

*Primary Examiner* — Glenford Madamba
(74) *Attorney, Agent, or Firm* — Kenneth L. Sherman, Esq.; Michael Zarrabian, Esq.; Sherman & Zarrabian LLP

(57) ABSTRACT

A method and system for providing information to a user of a device on a local network is provided. This involves obtaining information about current user activity on the local network, obtaining contextual information about current user activity on the local network and obtaining additional information interrelated to the contextual information and the user activity information. Then correlations are identified between the additional information, the contextual information and the user activity information. The correlations are used in forming a query to search for information related to the current user activity, to provide to the user.

37 Claims, 4 Drawing Sheets

(56) References Cited

U.S. PATENT DOCUMENTS

| | | |
|---|---|---|
| 6,774,926 B1 | 8/2004 | Ellis et al. |
| 6,807,675 B1 | 10/2004 | Maillard et al. |
| 6,826,512 B2 | 11/2004 | Dara-Abrams et al. |
| 6,842,877 B2 | 1/2005 | Robarts et al. |
| 6,954,755 B2 | 10/2005 | Reisman |
| 6,981,040 B1 | 12/2005 | Konig et al. |
| 7,028,024 B1 | 4/2006 | Kommers et al. |
| 7,054,875 B2 | 5/2006 | Keith, Jr. |
| 7,062,561 B1 | 6/2006 | Reisman |
| 7,069,575 B1 | 6/2006 | Goode et al. |
| 7,110,998 B1 | 9/2006 | Bhandari et al. |
| 7,158,961 B1 | 1/2007 | Charikar |
| 7,158,986 B1 | 1/2007 | Oliver et al. |
| 7,162,473 B2 | 1/2007 | Dumais et al. |
| 7,165,080 B2 | 1/2007 | Kotcheff et al. |
| 7,181,438 B1 | 2/2007 | Szabo |
| 7,194,460 B2 | 3/2007 | Komamura |
| 7,203,940 B2 | 4/2007 | Barmettler et al. |
| 7,225,187 B2 | 5/2007 | Dumais et al. |
| 7,283,992 B2 | 10/2007 | Liu et al. |
| 7,284,202 B1 | 10/2007 | Zenith |
| 7,343,365 B2 | 3/2008 | Farnham et al. |
| 7,363,294 B2 | 4/2008 | Billsus et al. |
| 7,386,542 B2 | 6/2008 | Maybury et al. |
| 7,389,224 B1 | 6/2008 | Elworthy |
| 7,389,307 B2 | 6/2008 | Golding |
| 7,433,935 B1 | 10/2008 | Obert |
| 7,483,921 B2 | 1/2009 | Tsuzuki et al. |
| 7,552,114 B2 | 6/2009 | Zhang et al. |
| 7,565,345 B2 | 7/2009 | Bailey et al. |
| 7,577,718 B2 | 8/2009 | Slawson et al. |
| 7,593,921 B2 | 9/2009 | Goronzy et al. |
| 7,603,349 B1 | 10/2009 | Kraft et al. |
| 7,613,736 B2 | 11/2009 | Hicken |
| 7,617,176 B2 | 11/2009 | Zeng et al. |
| 7,634,461 B2 * | 12/2009 | Oral et al. |
| 7,657,518 B2 | 2/2010 | Budzik et al. |
| 7,685,192 B1 | 3/2010 | Scofield et al. |
| 7,716,158 B2 | 5/2010 | McConnell |
| 7,716,199 B2 | 5/2010 | Guha |
| 7,725,486 B2 | 5/2010 | Tsuzuki et al. |
| 7,793,326 B2 | 9/2010 | McCoskey et al. |
| 7,889,915 B2 | 2/2011 | Reisman |
| 7,958,115 B2 | 6/2011 | Kraft |
| 8,028,323 B2 | 9/2011 | Weel |
| 8,090,606 B2 | 1/2012 | Svendsen |
| 2001/0003214 A1 | 6/2001 | Shastri et al. |
| 2001/0023433 A1 | 9/2001 | Natsubori et al. |
| 2002/0002899 A1 | 1/2002 | Gjerdingen et al. |
| 2002/0022491 A1 | 2/2002 | McCann et al. |
| 2002/0026436 A1 | 2/2002 | Joory |
| 2002/0032693 A1 | 3/2002 | Chiou et al. |
| 2002/0087535 A1 | 7/2002 | Kotcheff et al. |
| 2002/0147628 A1 | 10/2002 | Specter et al. |
| 2002/0161767 A1 | 10/2002 | Shapiro et al. |
| 2002/0162121 A1 | 10/2002 | Mitchell |
| 2003/0009537 A1 | 1/2003 | Wang |
| 2003/0028889 A1 | 2/2003 | McCoskey et al. |
| 2003/0033273 A1 | 2/2003 | Wyse |
| 2003/0105682 A1 | 6/2003 | Dicker et al. |
| 2003/0131013 A1 | 7/2003 | Pope et al. |
| 2003/0158855 A1 | 8/2003 | Farnham et al. |
| 2003/0172075 A1 | 9/2003 | Reisman |
| 2003/0184582 A1 | 10/2003 | Cohen |
| 2003/0221198 A1 | 11/2003 | Sloo |
| 2003/0229900 A1 | 12/2003 | Reisman |
| 2003/0231868 A1 | 12/2003 | Herley |
| 2004/0031058 A1 * | 2/2004 | Reisman .................. 725/112 |
| 2004/0073944 A1 | 4/2004 | Booth |
| 2004/0107821 A1 | 6/2004 | Alcalde et al. |
| 2004/0194141 A1 | 9/2004 | Sanders |
| 2004/0220925 A1 | 11/2004 | Liu et al. |
| 2004/0244038 A1 | 12/2004 | Utsuki et al. |
| 2004/0249790 A1 | 12/2004 | Komamura |
| 2005/0004910 A1 | 1/2005 | Trepess |
| 2005/0137966 A1 | 6/2005 | Munguia et al. |
| 2005/0144158 A1 | 6/2005 | Capper et al. |
| 2005/0154711 A1 | 7/2005 | McConnell |
| 2005/0160460 A1 | 7/2005 | Fujiwara et al. |
| 2005/0177555 A1 | 8/2005 | Alpert et al. |
| 2005/0240580 A1 | 10/2005 | Zamir et al. |
| 2005/0246726 A1 | 11/2005 | Labrou et al. |
| 2005/0289599 A1 | 12/2005 | Matsura et al. |
| 2006/0026152 A1 | 2/2006 | Zeng et al. |
| 2006/0028682 A1 | 2/2006 | Haines |
| 2006/0036593 A1 | 2/2006 | Dean et al. |
| 2006/0066573 A1 | 3/2006 | Matsumoto |
| 2006/0074883 A1 | 4/2006 | Teevan et al. |
| 2006/0084430 A1 | 4/2006 | Ng |
| 2006/0095415 A1 | 5/2006 | Sattler et al. |
| 2006/0129533 A1 | 6/2006 | Purvis |
| 2006/0133391 A1 | 6/2006 | Kang et al. |
| 2006/0136670 A1 | 6/2006 | Brown et al. |
| 2006/0156252 A1 | 7/2006 | Sheshagiri et al. |
| 2006/0156326 A1 | 7/2006 | Goronzy et al. |
| 2006/0161542 A1 | 7/2006 | Cucerzan et al. |
| 2006/0195362 A1 | 8/2006 | Jacobi et al. |
| 2006/0210157 A1 | 9/2006 | Agnihotri et al. |
| 2006/0242283 A1 | 10/2006 | Shaik et al. |
| 2007/0043703 A1 | 2/2007 | Bhattacharya et al. |
| 2007/0050346 A1 | 3/2007 | Goel et al. |
| 2007/0061222 A1 | 3/2007 | Allocca et al. |
| 2007/0061352 A1 | 3/2007 | Dimitrova et al. |
| 2007/0073894 A1 | 3/2007 | Erickson et al. |
| 2007/0078822 A1 | 4/2007 | Cuzerzan et al. |
| 2007/0107019 A1 | 5/2007 | Romano et al. |
| 2007/0130585 A1 | 6/2007 | Perret et al. |
| 2007/0143266 A1 | 6/2007 | Tang et al. |
| 2007/0156447 A1 | 7/2007 | Kim et al. |
| 2007/0179776 A1 | 8/2007 | Segond et al. |
| 2007/0198485 A1 | 8/2007 | Ramer et al. |
| 2007/0198500 A1 | 8/2007 | Lucovsky et al. |
| 2007/0208755 A1 | 9/2007 | Bhatkar et al. |
| 2007/0214123 A1 | 9/2007 | Messer et al. |
| 2007/0214488 A1 | 9/2007 | Nguyen et al. |
| 2007/0220037 A1 | 9/2007 | Srivastava et al. |
| 2007/0233287 A1 | 10/2007 | Sheshagiri et al. |
| 2007/0300078 A1 | 12/2007 | Ochi et al. |
| 2008/0040316 A1 | 2/2008 | Lawrence |
| 2008/0082744 A1 | 4/2008 | Nakagawa |
| 2008/0097982 A1 | 4/2008 | Gupta et al. |
| 2008/0114751 A1 | 5/2008 | Cramer et al. |
| 2008/0133501 A1 * | 6/2008 | Andersen et al. .................. 707/5 |
| 2008/0133504 A1 * | 6/2008 | Messer et al. .................. 707/101 |
| 2008/0162651 A1 | 7/2008 | Madnani |
| 2008/0162731 A1 | 7/2008 | Kauppinen et al. |
| 2008/0183596 A1 | 7/2008 | Nash et al. |
| 2008/0183681 A1 | 7/2008 | Messer et al. |
| 2008/0183698 A1 | 7/2008 | Messer et al. |
| 2008/0204595 A1 | 8/2008 | Rathod et al. |
| 2008/0208839 A1 | 8/2008 | Sheshagiri et al. |
| 2008/0235209 A1 | 9/2008 | Rathod et al. |
| 2008/0235393 A1 | 9/2008 | Kunjithaptham et al. .... 709/228 |
| 2008/0242279 A1 * | 10/2008 | Ramer et al. ................ 455/414.2 |
| 2008/0250010 A1 | 10/2008 | Rathod et al. |
| 2008/0266449 A1 | 10/2008 | Rathod et al. |
| 2008/0288641 A1 | 11/2008 | Messer et al. |
| 2009/0029687 A1 * | 1/2009 | Ramer et al. ................ 455/414.3 |
| 2009/0055393 A1 | 2/2009 | Messer et al. |
| 2009/0064017 A1 | 3/2009 | Biniak et al. |
| 2009/0070184 A1 | 3/2009 | Svendsen |
| 2009/0077052 A1 | 3/2009 | Farrelly |
| 2009/0077065 A1 | 3/2009 | Song et al. |
| 2009/0112848 A1 | 4/2009 | Kunjithapatham et al. |
| 2009/0119717 A1 | 5/2009 | Newton et al. |
| 2010/0070895 A1 | 3/2010 | Messer |
| 2010/0191619 A1 | 7/2010 | Dicker et al. |
| 2010/0281393 A1 | 11/2010 | Fujioka |
| 2011/0208768 A1 * | 8/2011 | Mehanna .................. 707/766 |

FOREIGN PATENT DOCUMENTS

| | | |
|---|---|---|
| CN | 1585947 | 2/2005 |
| CN | 1723458 | 1/2006 |

(56) References Cited

FOREIGN PATENT DOCUMENTS

| | | |
|---|---|---|
| CN | 1808430 | 7/2006 |
| CN | 1848742 | 10/2006 |
| CN | 1906610 | 1/2007 |
| JP | 2003-099442 | 4/2003 |
| JP | 2004505563 | 2/2004 |
| JP | 2006/228198 | 8/2006 |
| JP | 2007-012013 | 1/2007 |
| KR | 10-2002-0005147 A | 1/2002 |
| KR | 10-2002-0006810 A | 1/2002 |
| KR | 10-2004-0052339 A | 6/2004 |
| KR | 10-2006-0027226 A | 3/2006 |
| WO | WO 01/37465 A2 | 5/2001 |
| WO | WO 02/43310 A2 | 5/2002 |
| WO | WO 03/042866 | 5/2003 |
| WO | WO 2005/055196 A2 | 6/2005 |
| WO | WO 2005/072157 | 8/2005 |
| WO | WO 2007/004110 A2 | 1/2007 |

OTHER PUBLICATIONS

Babaguchi, N. et al., "Intermodal collaboration: A strategy for semantic content analysis for broadcasted sports video," Sep. 2003, pp. 13-16.

Brill, E., "A simple rule-based part of speech tagger," Mar. 1992, Proceedings of the Third Conference on Applied Natural Language Processing, Trento, Italy.

Google Inc., Google Search Engine, http://www.google.com, Aug. 1998.

Google Inc., Google Desktop Search, http://desktop.google.com, Oct. 15, 2004.

Henzinger, M. et al, "Query-free news search," May 2003, Proceedings on the 12th International Conference on World Wide Web, Budapest, Hungary.

Livingston, K. et al., "Beyond broadcast: a demo," Jan. 2003, In Proceedings of the 8th international Conference on intelligent User interfaces, ACM Press, New York, NY, 325-325.

Microsoft Corporation, Microsoft Windows Media Player, http://www.microsoft.com/windows/windowsmedia/, Feb. 1999.

Microsoft Corporation, MSN TV, http://www.webtv.com/pc, Feb. 2006.

Opera Software ASA, Opera Browser for Devices, http://www.opera.com/products/devices/, Mar. 2006.

Rau Lisa, F. et al, "Domain-independent summarization of news," Jun. 1994, In Summarizing Text for Intelligent Communication, pp. 71-75, Dagstuhl, Germany.

Spalti, M., "Finding and Managing Web Content with Copernic 2000," Sep. 2000, Library Computing, Westport, pp. 217-221, vol. 18, No. 3.

Tjondronegoro, D. et al., "Extensible detection and indexing of highlight events in broadcasted sports video," Jan. 2006, Proceedings of the 29th Australasian Computer Science Conference, Hobart, Australia.

Wachman, J. et al., "Tools for Browsing a TV Situation Comedy Based on Content Specific Attributes," Mar. 2001, Multimedia Tools and Applications, v.13 n. 3, p. 255-284.

Yahoo Search Engine, http://search.yaboo.com, Dec. 1998.

Zhuang, Y. et al, "Applying semantic association to support content-based video retrieval," Oct. 1998, International workshop on Very Low Bitrate Video Coding (VLBV'98).

http://www.real.com, downloaded Sep. 19, 2008.

http://www.microsoft.com/windows/windowsmedia/mp10, downloaded Sep. 19, 2008.

Miyamori, H.; and Tanaka, K. "Webified Video: Media Conversion from TV Programs to Web Content for Cross-Media Information Integration," Proc. Of the 16th International Conference on Database and Expert Systems Applications, Copenhagen, Denmark, 2005, pp. 176-185.

Moraveji, N.; Thambiratnam, K.; and Jun, L. "DynaLine: A Non-Disruptive TV User Interface for Passive Browsing of Internet Video," Microsoft Research Technical Report, Beijing, China, 2006.

Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.

Notification of Transmittal of the International Search Report and the Written Opinion of the International Search Authority Application No. PCT/KR2008/000537 dated May 15, 2008, 16 pages.

Notification of Transmittal of the International Search Report and the Written Opinion of the International Searching Authority for International Application No. PCT/KR2008/001558, dated Jun. 26, 2008, 10 pages.

U.S. Non-final Office Action for U.S. Appl. No. 11/732,887 mailed Jun. 5, 2009.

Livingston, K. et al., "Beyond Broadcast," 8th International Conference on Intelligent User Interfaces, Jan. 2003, pp. 260-262, Association for Computing Machinery, New York, NY.

"Placement in the DMOZ.org directory—Pure Power", DMOZ / Google Directory, posted on Apr. 30, 2005, p. 1, http://www.ahfx.net/weblog/13.

Microsoft Corporation, Microsoft Windows Media Player 10, http://www.microsoft.com/windows/windowsmedia/mp10, Jun. 2004, US.

Realnetworks, Inc., http://www.real.com, Jun. 1997, U.S.

Copernic Inc., Copernic Search Engine for your PC, http://www.copernic.com, Sep. 19, 2008, US.

U.S. Office Action for U.S. Appl. No. 11/633,880 mailed Jan. 6, 2009.

U.S. Office Action for U.S. Appl. No. 11/633,880 mailed Aug. 10, 2009.

U.S. Office Action for U.S. Appl. No. 11/713,350 mailed Mar. 2, 2009.

U.S. Office Action for U.S. Appl. No. 11/713,350 mailed Aug. 14, 2009.

U.S. Office Action for U.S. Appl. No. 11/725,865 mailed Oct. 16, 2009.

U.S. Non-final Office Action for U.S. Appl. No. 11/633,880 mailed May 11, 2010.

Vechtomova, O. et al., "Query expansion with terms selected using lexical cohesion analysis of documents", Information Processing and Management: an International Journal, Oct. 2006, pp. 849-865, vol. 43, No. 4, Pergamon Press Inc., Tarrytown, New York, United States.

U.S. Final Office Action for U.S. Appl. No. 11/633,880 mailed Oct. 28, 2010, United States.

U.S. Non-final Office Action for U.S. Appl. No. 11/725,865 mailed Sep. 14, 2010, United States.

U.S. Final Office Action for U.S. Appl. No. 11/713,350 mailed Sep. 9, 2010, United States.

"Computing Meng Individual Project, ANSES—Automatic News Summarization and Extraction System," http://mmis.doc.ic.ac.uk/pr-1.wong-2002/overview.html, downloaded Sep. 24, 2008, 4 pages.

Chinese Office Action dated Aug. 14, 2009 issued in Chinese Patent Application No. 2008100826213 (English language translation included).

Copernic Inc., http://www.copernic.com/en/products/desktop-search/index.html, Sep. 19, 2008, 1 page.

Final Office Action dated Jun. 17, 2010 from U.S. Appl. No. 11/981,019.

Final Office Action dated Mar. 16, 2011 from U.S. Appl. No. 11/981,019.

Google Inc., webhp, http://www.google.com/webhp?complete-1 &hl-en, downloaded Sep. 25, 2008, p. 1.

Miura, K. et al., "Automatic Generation of a Multimedia Encyclopedia from TV Programs by Using Closed Captions and Detecting Principal Viedo Objects, "Proceedings of the Eigth IEEE International Sympsosium on Miltumedia (ISM '06), 2006, IEEE, 8 pages.

Miyauchi et al., "Highlight Detection and Indexing in Broadcast Sports Video by Collaborative Processing of Text, Audio, and Image," Sytstems and Computers in Japan, vol. 34, No. 12, 2003, pp. 22-31, Translated from Denshi Joho Tsushin Gakkai Ronbunshi, vol. J85-D-II, No. 11, Nov. 2002, pp. 1692-1700.

(56) References Cited

OTHER PUBLICATIONS

Nitta, Naoka et al., "Automatic Story Segmentation of Closed-Caption Text for Semantic Content Analysis of Broadcasted Sports Video," 8th International Workshop on Multimedia Information Systems, 2002, pp. 110-116.
Office Action dated Aug. 19, 2011 from U.S. Appl. No. 11/821,938.
Office Action dated Aug. 2, 2011 from U.S. Appl. No. 11/713,312.
Office Action dated Aug. 22, 2011 from U.S. Appl. No. 11/981,019.
Office Action dated Dec. 29, 2009 from U.S. Appl. No. 11/981,019.
Office Action dated Jul. 6, 2011 from U.S. Appl. No. 11/789,609.
Office Action dated Jun. 27, 2011 from U.S. Appl. No. 11/725,865.
Office Action dated Mar. 25, 2010 from Chinese Patent Application No. 200810082621.3, 7pp., China (English-language translation included-15 pp).
Office Action dated Oct. 6, 2010 from U.S. Appl. No. 11/981,019.
Tivo Inc., http://www.tivo.com, downloaded Sep. 19, 2008, 1 page.
U.S. Final Office Action for U.S. Appl. No. 11/969,778 mailed on Sep. 2, 2010.
U.S. Final Office Action for U.S. Appl. No. 12/056,184 mailed on Nov. 23, 2010.
U.S. Non-final Office Action for U.S. Appl. No. 11/713,350 mailed Mar. 8, 2010.
U.S. Non-Final Office Action for U.S. Appl. No. 11/726,340 mailed May 19, 2009.
U.S. Non-final Office Action for U.S. Appl. No. 11/969,778 mailed on Apr. 19, 2010.
U.S. Non-final Office Action for U.S. Appl. No. 12/056,184 mailed on Jun. 11, 2010.
U.S. Office Action for U.S. Appl. No. 11/633,880 mailed Mar. 17, 2011.
U.S. Office Action for U.S. Appl. No. 11/725,865 mailed Mar. 4, 2011.
U.S. Office Action for U.S. Appl. No. 11/726,340 mailed Dec. 9, 2009.
U.S. Office Action for U.S. Appl. No. 11/726,340 mailed Feb. 14, 2011.
U.S. Office Action for U.S. Appl. No. 11/726,340 mailed Oct. 14, 2010.
U.S. Office Action for U.S. Appl. No. 11/732,887 mailed on Dec. 4, 2009.
U.S. Office Action for U.S. Appl. No. 11/969,778 mailed Jun. 15, 2011.
U.S. Office Action for U.S. Appl. No. 12/263,089 mailed Mar. 25, 2011.
U.S. Non-Final Office Action for U.S. Appl. No. 12/544,994 mailed Jul. 17, 2013.
U.S. Non-Final Office Action for U.S. Appl. No. 11/633,880 mailed Sep. 26, 2013.
Japanese Office Action dated Nov. 20, 2012 for Japanese Application No. 2009554447 from Japan Patent Office, pp. 1-4, Tokyo, Japan (Machine generated English-language translation included, pp. 1-2).
Chinese Office Action dated Mar. 7, 2013 for Chinese Application No. 200880016311.X from China Intellectual Property Office, pp. 1-25, People's Republic of China (English-language translation included, pp. 1-16).
U.S. Notice of Allowance for U.S. Appl. No. 11/726,340 mailed Apr. 29, 2013.
Office Action dated Mar. 29, 2012 from U.S. Appl. No. 11/726,340.
Office Action dated Mar. 30, 2012 from U.S. Appl. No. 11/633,880.
Japanese Office Action dated Mar. 21, 2012 from Japanese Application No. 2009-554447.
Chinese Office Action dated Apr. 17, 2012 from Chinese Application No. 200880016311.X.
Japanese Office Action dated Apr. 10, 2012 from Japanese Application No. 2010-508303.
U.S. Final Office Action for U.S. Appl. No. 12/544,994 mailed Nov. 5, 2013.
Final Office Action dated Sep. 1, 2011 from U.S. Appl. No. 12/263,089.
Office Action dated Sep. 8, 2011 from U.S. Appl. No. 12/544,994.
Final Office Action dated Sep. 21, 2011 from U.S. Appl. No. 11/633,880.
Final Office Action dated Sep. 27, 2011 from U.S. Appl. No. 11/969,778.
Notice of Allowance dated Nov. 1, 2011 from U.S. Appl. No. 11/821,938.
Chinese Office Action dated Feb. 1, 2011 from Chinese Application No. 2007101962371.
Chinese Office Action dated Sep. 23, 2011 from Chinese Application No. 200880016311.X.
Chinese Office Action dated Sep. 8, 2011 from Chinese Application No. 200880009063.6.
Office Action dated Jan. 17, 2012 from U.S. Appl. No. 12/544,994.
Notice of Allowance dated Jan. 30, 2012 from U.S. Appl. No. 11/981,019.
Chinese Office Action dated Aug. 28, 2012 for Chinese Application No. 200880016311.X from China Patent Office, pp. 1-24, People's Republic of China (English-language translation included, pp. 1-15).
U.S. Notice of Allowance for U.S. Appl. No. 11/633,880 mailed Oct. 24, 2012, United States.
U.S. Final Office Action for U.S. Appl. No. 12/544,994 mailed Oct. 23, 2012, United States.
U.S. Advisory Action for U.S. Appl. No. 12/544,994 mailed Jan. 23, 2013.
AOL LLC, http://www.aol.com, downloaded Sep. 19, 2008, pp. 1-2, United States.
Ask Search Engine, http://www.ask.com, downloaded Sep. 19, 2008, pp. 1, United States.
U.S. Advisory Action for U.S. Appl. No. 11/633,880 mailed Nov. 25, 2009.
U.S. Non-final Office Action for U.S. Appl. No. 11/900,847 mailed Oct. 28, 2009.
U.S. Final Office Action for U.S. Appl. No. 11/725,865 mailed Mar. 16, 2010.
U.S. Final Office Action for U.S. Appl. No. 11/633,880 mailed May 7, 2014.
U.S. Non-Final Office Action for U.S. Appl. No. 12/544,994 mailed Mar. 28, 2014.

* cited by examiner

METHOD AND SYSTEM FOR PROVIDING RELEVANT INFORMATION TO A USER OF A DEVICE IN A LOCAL NETWORK

FIELD OF THE INVENTION

The present invention relates to providing relevant information to users, and in particular to providing relevant information to users with minimal user input.

BACKGROUND OF THE INVENTION

The availability of vast and rich information on the Internet has changed business and has dramatically impacted many aspects of social and home lives. As a result, searching for information on the Internet with the aid of a search engine using a browser has become one of the primary ways of obtaining information.

Meanwhile, advances in hardware and software technologies in recent years have enabled users such as home network users to equip their networks with networked consumer electronics (CE) devices, which often can store large amounts of content. User experience in searching for information can be greatly enriched by seamlessly receiving related information from the Internet while accessing content available in the home network. The related information includes information that is related to the content accessed by the user, and as a result such related information is likely of potential interest to the user.

However, searching for information using conventional technologies requires users to repeatedly enter and modify query keywords using a keyboard. As a result, the conventional searching experience is limited to computing devices with a keyboard. Further, the degree of success in finding information of interest is highly dependent on user knowledge and skill in forming a good query. Moreover, search engines often return large amounts of search results (i.e., hits). For a user, having to repeatedly modify a query and inspect numerous hits on a CE device that has limited computing resources and no convenient input devices, can be a trying and time consuming experience.

Certain Internet search engines provide both enterprise data searching using Enterprise appliance products, and personal data searching using Personal Desktop search applications. Desktop search applications (e.g., Google Desktop Search, Copernic) are extensions of Internet searches where users can now search for content on their computers. However, such search engines have several shortcomings, including: (1) requiring users to form queries; (2) requiring users to have knowledge and skills to form/refine the queries in order to obtain desired results; (3) requiring significant computing resources exceeding that provided in CE devices such as TVs, DVD player, DVRs, Set-top boxes, etc.; (4) requiring input devices such as a keyboard for entering a significant amount of text; and (5) requiring a powerful PC-type computing device to allow users to inspect a large amount of search results.

Similarly, media players, such as Windows Media Player, Real Player etc., extract related metadata information from the Internet for music CDs played using such media players. Typically, such media players maintain a standard set of metadata types that could be extracted and displayed, and rely on specific websites to obtain the required metadata. However, these media players do not allow the user to access random information related to a music CD (e.g., lyrics of a song, artist biography). This is because such random information is hot among the standard metadata information available on the specific websites pre-configured for access. Further, because such media players rely on specific websites, if those websites become inaccessible, the media players would fail to obtain the metadata information, even though the required information may be available on some other website or resource.

BRIEF SUMMARY OF THE INVENTION

The present invention provides a method and system for providing information to a user of a device on a local network. In one embodiment, this involves obtaining information about current user activity on the local network, obtaining contextual information about current user activity on the local network and obtaining additional information interrelated to the contextual information and the user activity information. Then, correlations are identified between the additional information, the contextual information and the user activity information. The correlations are used in forming a query to search for information related to the current user activity.

Forming a query includes automatically forming a query without requiring user intervention. The query is executed to obtain search results including information related to the current user activity. The search results are presented to the user on a user interface in the device, such as a consumer electronics device. User interface functions are mapped to a small number of key presses on the device for minimizing the need for user involvement.

In one implementation, the present invention allows seamlessly bringing relevant Internet information to a user by data correlation, with minimal user input. This enriches the experience in using CE devices, without requiring the user to enter queries. As such, a user can utilize a CE device for searching information using a small number of keys, without a keyboard, and can obtain relevant information (i.e., information of interest) from the Internet with minimal involvement in query construction, query refinement and searching.

These and other features, aspects and advantages of the present invention will become understood with reference to the following description, appended claims and accompanying figures.

DETAILED DESCRIPTION OF THE INVENTION

The present invention provides a method and system for providing relevant information to users. In one embodiment, this involves seamlessly bringing relevant Internet information to a user by data correlation, with minimal user input. This enriches the experience in using CE devices, without requiring the user to enter queries. For example, the present invention enables a user to utilize a CE device for searching information using a small number of keys without a keyboard, and to obtain desired/relevant information from the Internet with minimal involvement in query construction. The present invention improves the precision in obtaining relevant search results for the user that is easily accessible to a user utilizing a resource-limited CE device. Further, the present invention suggests information of potential interest to the user based on the nature of user interaction with a CE device.

Figure 1:
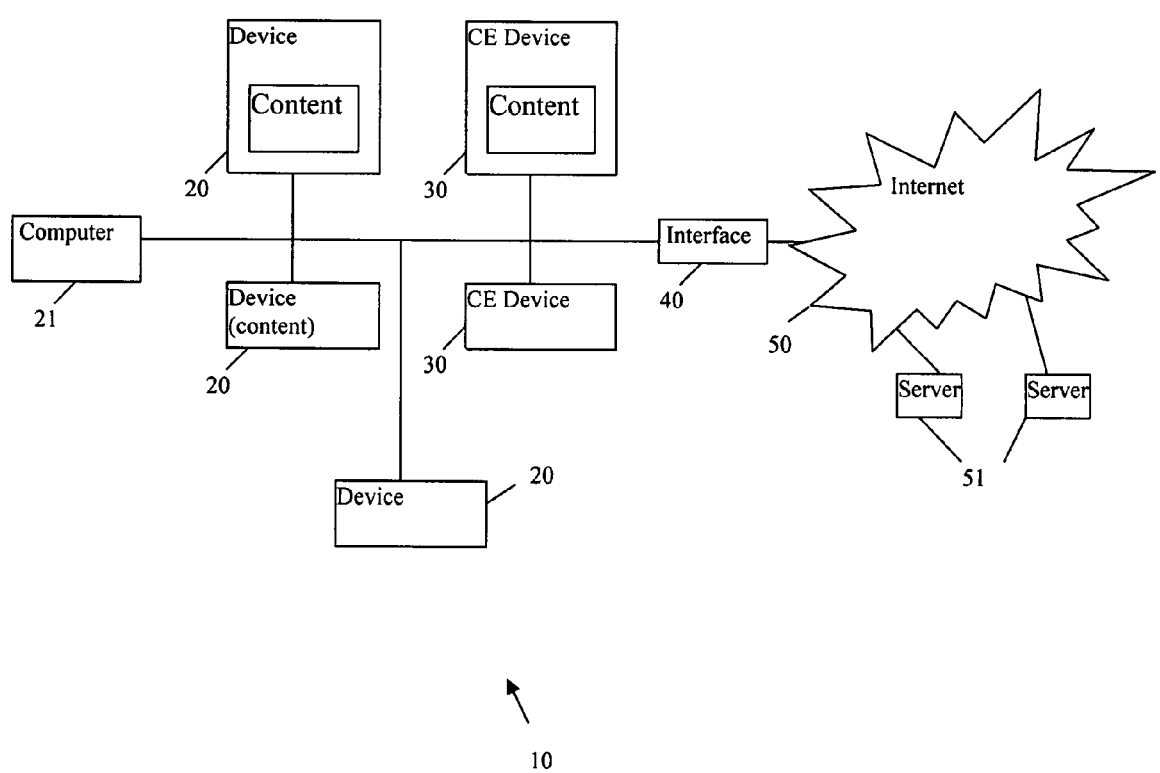
FIG. 1 shows an example of a network implementing a process for providing relevant information to users, according to an embodiment of the present invention.

FIG. 1 shows a functional architecture of an example network 10, such as a home network, embodying aspects of the present invention. The network 10 comprises devices 20 which may include content, a PC 21, CE devices 30 (e.g., TV, VCR, STB, cell phone, PDA) which may include content, and an interface 40 that connects the network 10 to an external network 50 (e.g., another local network, the Internet). The external network 50 is connected to one or more servers 51. Though the devices 20 and 30 are shown separately, a single physical device can include one or more logical devices.

The devices 20 and 30 can implement the HTTP protocol which uses Universal Plug and Play (UPnP) for communication therebetween. Though in the example described herein the HTTP protocol is utilized by the network 10, those skilled in the art will recognize that the present invention is useful with other network communication protocols (e.g., Jini, HAVi, IEEE 1394).

The process for providing relevant information to a user of a CE device on a local network such as a home network generally involves:

1. Gathering information about current activities of the user on the local network (e.g., listening to a song, watching a TV program);
2. Gathering contextual information about current user activity on the local network (e.g., finding the metadata of a song or a TV program);
3. Obtaining additional information interrelated to the information gathered in the above steps from other sources, such as the devices on the local network and/or information from external sources such as the Internet (e.g., obtaining information related to a song or a TV program);
4. Identifying correlations in the information obtained in the above steps;
5. Using the correlations in forming queries to search for information in local and/or external sources such as the Internet; and
6. Presenting the search results to the user as information related to the current user activity (i.e., information of interest to the user).

Identifying correlations can be performed in one or more of the following example ways: (1) identifying correlations between information about current user activity and the interrelated information obtained from local sources, (2) identifying correlations between information about current user activity and the interrelated information obtained from external sources, and (3) identifying correlations between information about current user activity and the interrelated information obtained from local and external sources.

An implementation of the above process for providing relevant information to a user of a CE device in the home network is now described in more detail. In order to minimize the number of keystrokes a user has to enter to receive information related to the current user activity, functionalities that support information searching are mapped to a small number of keys (e.g., mapping searches to a few keys of a remote control). Then, certain information is gathered about current user activity on CE devices. This includes obtaining metadata contained in media that is accessible only by content-rendering CE devices (e.g., length and type of the content contained in a CD or a DVD).

The process further involves obtaining information embedded in broadcast streams that are accessible only by a receiving/rendering CE device (e.g., subtitles and closed captions). In addition, information is gathered about content already existing on the home network (e.g., songs by Sting that are already owned by the user and the corresponding metadata). Further information is gathered about relevant structured data that exists on the Internet (e.g., gathering metadata about the songs already owned by the user from a compact disk database (CDDB)). Additional relevant information is obtained from semi-structured data that exists on the Internet (e.g., the biography of an artist from the Internet Movie Database (IMDb) and/or from the relevant web pages). Further relevant information is gathered from unstructured data that exists on the Internet (e.g., URLs of the web pages carrying the geographical, economical, political, and cultural information about the place from which main events are being reported in the news).

The gathered/obtained information defines the information at hand. Then, when a user operates a CE device, the user input to a CE device is correlated with the information at hand to automatically form queries to search for related information. This minimizes the need for the user to generate queries or use a keyboard in forming queries.

Then, from the information at hand, the data extracted from the Internet sources is correlated with the data extracted from home network content to form a query plan to refine the queries for precision searching. The query plan is then executed for searching the queries on the external network (e.g., the Internet, other resources), without requiring user intervention. The query execution results, in the form of search results, are then presented to the user. Preferably, based on the information at hand, the most relevant information from the search results is selected for presentation to the user, without requiring user intervention. Therefore, the information presented to the user includes information of potential interest to the user as related to the information at hand.

Figure 2:
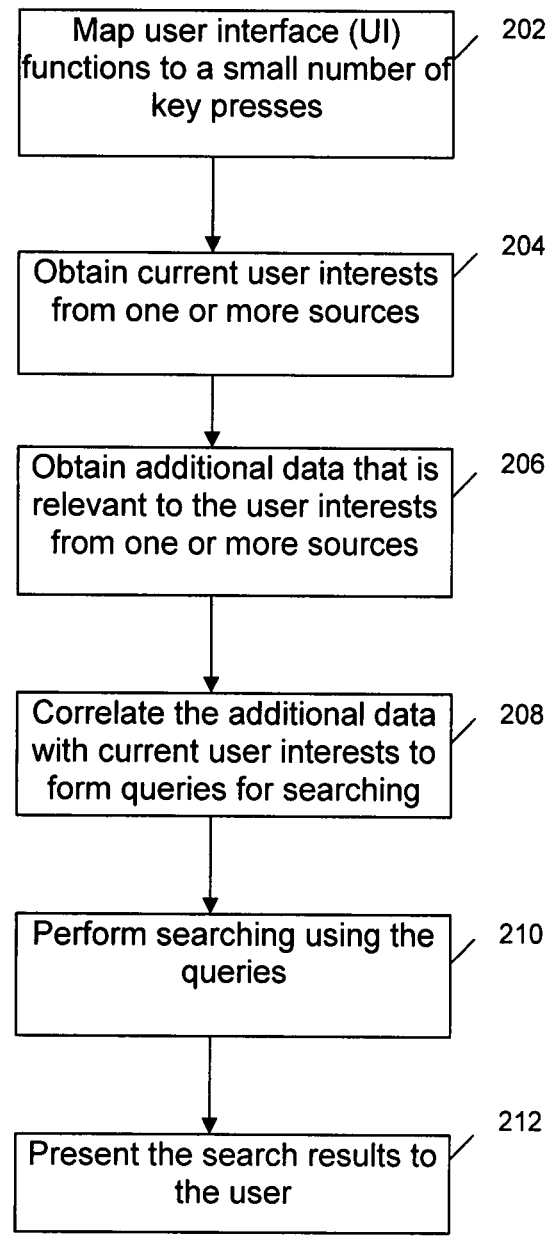
FIG. 2 shows a flowchart of the steps of a process for providing relevant information to users to augment user experiences with minimal user input, according to an embodiment of the present invention.

FIG. 2 shows a flowchart of the steps of a process 200 for providing relevant information to a user of a CE device on the home network, according to an embodiment of the present invention, including the steps of:

Step 202: Mapping user interface (UI) functions to a small number of key presses;
Step 204: Obtaining current user interests from one or more sources (e.g., receiving user input, obtaining current user activity information from the state of the applications running on home devices);
Step 206: Obtaining additional data that is relevant to the user's interests from one or more sources (e.g., metadata available at the home network, a user profile maintained within the home network, external structured data sources, external unstructured data sources, external semi-structured data sources, external broadcast data sources, contextual information for data at hand);
Step 208: Correlating the additional data with current user interests and identifying additional correlations among such data for forming and refining queries for precision searching;
Step 210: Searching the external network based on the queries to obtain search results.
Step 212: Presenting the search results to the user. Preferably, by correlating the search results to the information at hand, the most relevant information from the search results is selected for presentation to the user.

Figure 3:
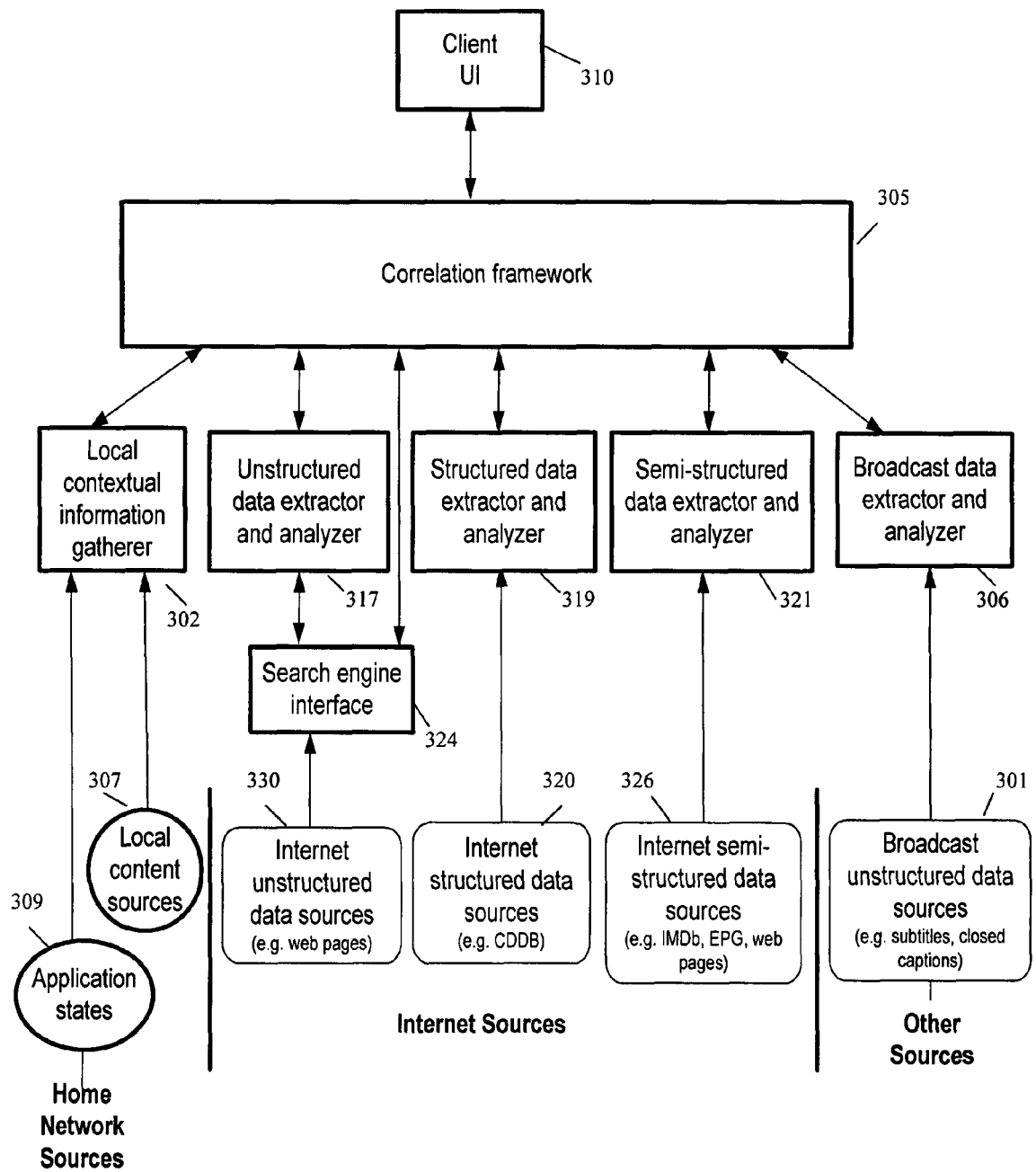
FIG. 3 shows an example of a functional block diagram of a system implementing a process for providing relevant information to users utilizing data correlation, according to the present invention.

FIG. 3 shows a functional block diagram of an example system 300 that encapsulates and implements a process for providing relevant information to a user of a CE device in a local network, according to the present invention. The system 300 comprises a client user interface 310, a correlation framework 305, a local contextual information gatherer 302, an unstructured data extractor and analyzer 317, a structured data extractor and analyzer 319, a semi-structured data extractor and analyzer 321, a broadcast data extractor and analyzer 306 and a search engine interface 324. The system further comprises home network data sources including local content sources 307 and application states 309. The system further comprises Internet sources including Internet unstructured data sources 330, Internet structured data sources 320, Internet semi-structured data sources 327, and other sources including broadcast unstructured data sources 301.

Elements/Components 310, 305, 302, 317, 319, 321, 306 and 324 in the system 300 represent processing components, each of which can typically be implemented as a software module running on electronics devices with CPU and memory. All these components can run on a single device. Alternatively, they can be partitioned and implemented so as to run on more than one device connected by one or more interconnected networks. For example, in one implementation, the devices are connected by a home local area network (LAN), in another embodiment some of the modules of the components run on the devices connected by the home LAN and others run on devices reachable through the Internet.

Further, the elements 307 and 309 in the system 300 represent in-home data sources reachable through a home LAN, and the elements 330, 320, 327 and 301 in the system 300 represent out-of-home sources reachable through a wide area network (WAN) e.g., through the Internet, a telecommunication network, or a broadcast network such as a cable network and satellite network. The arrows connecting the elements in the system 300 indicate the interactions between the elements with the arrowheads pointing towards the direction of data flowing between the elements. The various elements in the system 300 are described in more detail below.

Data Source Elements

The system 300 only requires local content sources 307, application states 309, and the Internet unstructured data sources 330. All the other data sources are optional. Although in FIG. 3 several types of data sources are shown, as those skilled in the art will recognize, the principles of the present invention are applicable to other types of data sources as well.

The local content sources 307 include information about the digital contents at home stored on, e.g., CD's, DVD's, tapes, internal hard disks and removable storage devices.

The local application states 309 include information about the current user activity using one or more devices 20 or 30, e.g., the user is listening to music using a DTV, or a media player.

The Internet unstructured data sources 330 includes data or data segments whose semantics cannot be analyzed, e.g., free text. Internet servers that host web pages typically contain this kind of data.

The Internet structured data sources 320 includes data whose semantics are closely defined. Internet servers that host XML data enclosed by semantic-defining tags, and Internet database servers such as CDDB are examples of such sources.

The Internet semi-structured data sources 327 includes data that have tags to define the free-form data without describing the semantics of the data. For example, a review section of an XML-based EPG data is semi-structured data; it is tagged as <review> ... </review>, but without defining the semantics of the enclosed text. Most web pages contain semi-structured data. Internet servers that host this kind of data are examples of such sources.

The broadcast unstructured data sources 301 include unstructured data embedded in media streams. Cable receivers, satellite receivers, TV antennas, and radio antennas are examples of such data sources.

Processing Components

In the system 300, the required processing components are the client user interface 310, the correlation framework 305, the search engine interface 324, and the local contextual information gatherer 302. The remaining processing components are optional.

The client user interface (UI) 310 interacts with a user. It maps UI functions to a small number of keys, takes user input from the selected keys and passes the input to the correlation framework (CF) 305 in a predefined form. Further, the UI 310 displays the results passed back from the CF 305 when instructed by the CF 305. An example of the UI 310 includes a module that receives signals from a remote control, and a web browser that overlays on a TV screen to display search results.

The CF 305 takes input from the UI 310, the local contextual information gatherer 302, the search engine interface 324, and optionally other components, and forms an initial query based on the current activity of the user. The CF 305 is described in more detail further below.

The local contextual information gatherer (LCIG) 302 collects metadata and other contextual information about the contents on the local/home network. The LCIG 302 also derives contextual information from existing contextual information such as metadata. Examples of metadata of content include title, type, artist, time of publication, album, band, actors, and language.

The LCIG 302 also performs the following tasks: gathering metadata from local (home) sources whenever new content is added to the local collection; gathering information about current user activity on the local network based on the states of applications running on the local network devices (e.g., devices 30 in FIG. 1); accepting metadata and/or contextual information extracted from Internet sources and other external sources that describes the local content.

The LCIG 302 further derives contextual information from the available data (i.e., the data at hand). The LCIG 302 maintains a local metadata cache 303 (FIG. 4), stores the collected metadata in the cache 303, and provides an interface for other modules to add, delete, access, and modify the metadata in the cache 303. An example of the LCIG 302 is described in related U.S. patent application Ser. No. 11/633,880, filed Dec. 4, 2006, entitled "Method and Apparatus for Contextual Search and Query Refinement on Consumer Electronics Devices," incorporated herein by reference.

The search engine interface (SEI) 324 receives a query as input (e.g., from the CF 305), and sends the query over the Internet using a predefined Internet communication protocol such as HTTP. The SEI 324 also accepts the response to the query sent by the search engine(s) on the Internet, and passes the response to the component or device that issued the query.

The unstructured data extractor and analyzer 317 receives a query from the CF 305 as input and passes the query to the SEI 324. The unstructured data extractor and analyzer 317 receives the response returned from the SEI 324, extracts highly-relevant terms therefrom that are not already in the query, and returns the terms to the CF 305.

The structured data extractor and analyzer 319 takes query input from the CF 305, uses the input to access structured data from Internet structured data sources 320 according to predefined protocols such as HTTP or proprietary remote access protocols. The structured data extractor and analyzer 319 extracts the desired metadata from the results based on the query, and returns the metadata to the CF 305.

The semi-structured data extractor and analyzer 321 takes query input from the CF 305, uses the input to access semi-structured data from Internet semi-structured data sources 327, according to predefined protocols, e.g., HTTP and SOAP. After the semi-structured data extractor and analyzer 321 receives the results and extracts the desired metadata and/or a list of terms from the results based on the query, the semi-structured data extractor and analyzer 321 may use all or a part of the extracted items to form one or more new queries to refine the quality of the list of terms. The refinement can be performed with one or more iterations, each of which may use more or less of the terms, a partially overlapped set of terms, or a different set of terms. The semi-structured data extractor and analyzer 321 then returns the final list of terms and/or metadata to the CF 305.

The broadcast data extractor and analyzer 306 takes query input from the CF 305, and uses defined interfaces of a particular media to access text data embedded in the broadcast stream, e.g., subtitles and closed captions. It extracts the desired terms from the embedded text and returns the data to the CF 305.

The CF 305 performs the following steps:

Gathering Data

Based on user activity and/or user input, the CF 305 instructs the LCIG 302 to obtain contextual information about the user activity and/or user input. Based on the user activity and/or user input, the CF 305 instructs the unstructured data extractor and analyzer 317 to gather more data about the activity and/or user input. Based on the user activity and/or user input, the CF 305 instructs the structured data extractor and analyzer 319 to gather more data about the activity and/or user input. Based on the user activity and/or user input, the CF 305 instructs the semi-structured data extractor and analyzer 321 to gather more data about the activity and/or user input. Based on the user activity and/or user input, the CF 305 instructs the broadcast data extractor and analyzer 306 to gather more data about the activity and/or user input. The data gathering and correlation processes can be iterative based on defined evaluation criteria to determine the quality of the data gathered.

The data gathering process can be performed in real time or in the background and use the data when needed. For example, if a user has expressed interest in song lyrics, the CF 305 may initiate a pre-fetch for the lyrics of more songs when computing resources are available to show the user when a user issues such a request.

Correlating Data

The CF 305 correlates the data gathered from the Internet sources (e.g., sources 330, 320, 326) and other external sources (e.g., source 301), with the data gathered locally, and with the activity and user input, if any. The correlation may be performed according to the rules defined for different types of information sources and/or for different user interests.

Presentation

Based on the available metadata about the current user activity, the CF 305 instructs the UI 310 to display suggestions for related information, e.g., the biography of the artist and the lyrics of the song currently being played, and to provide a way for the user to buy more songs from the same artist.

Orchestration

Based on the current activity and the user input (e.g., to buy more songs), the CF 305 forms a query plan (e.g., for finding the songs already existing at home, finding the songs available on the Internet, and finding the songs that can be suggested to the user for purchase). The CF 305 then orchestrates the execution of the query plans (e.g., via the SEI 324), and receives result of the query execution (search results). The CF 305 passes the search results to the UI 310 for display.

An example of the CF 305 is described in related U.S. patent application Ser. No. 11/726,340, filed Mar. 21, 2007, entitled "A Framework for Correlating Content on a Local Network with Information on an External Network," incorporated herein by reference. In the embodiment shown in FIG. 3, components 307 and 309 can reside on the local network, while components 320, 326 and 330 reside outside the local network. The remaining components reside on a CE device on the network.

Further, information gathering is performed by components 302, 317, 319, 321, 306, while information correlation is performed by the correlation framework 305. Further, query formation is performed by the correlation framework 305 using the local contextual information gatherer 302.

Figure 4:
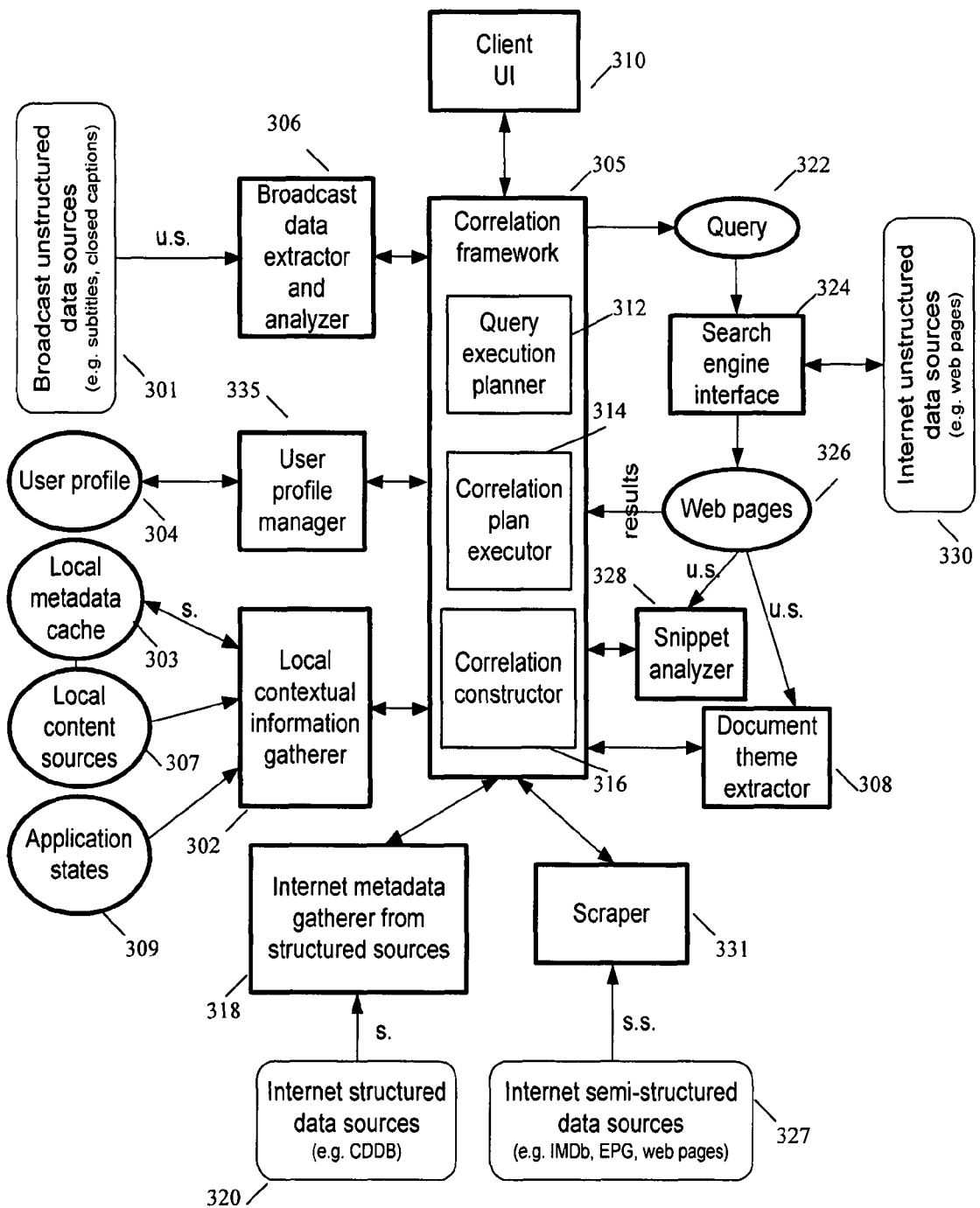
FIG. 4 shows an example of a functional block diagram of another system implementing a process for providing relevant information to users utilizing data correlation, according to the present invention.

FIG. 4 shows a functional block diagram of another example system 400 that implements a process for providing relevant information to a user of a CE device in a local network, according to the present invention. The system 400 includes: a broadcast unstructured data sources 301, a local contextual information gatherer 302, a local metadata cache 303, a user profile 304, a broadcast data extractor and analyzer 306, local content sources 307, a document theme extractor 308, application states 309, a client UI 310, Internet metadata gatherer from structured sources 318, Internet structured data sources 320, a search engine interface 324, web pages 326, a snippet analyzer 328, Internet unstructured data sources 330, a scraper 331, a user profile manager 335, Internet semi-structured data sources 327, and a correlation framework 305 which includes a query execution planner 312, a correlation plan executor 314 and a correlation constructor 316.

In place of the unstructured data extractor and analyzer 317 of system 300 in FIG. 3, the system 400 in FIG. 4 includes the snippet analyzer 328 and the document theme extractor 308. A query 322 is shown as an input for the search engine interface 324, and the web pages 326 are shown as output of the search engine interface 324. In place of the semi-structured data extractor and analyzer 321 of system 300 in FIG. 3, the system 400 in FIG. 4 includes a scraper 331. The local contextual information gatherer 302 takes an additional input from the local metadata cache 303 and stores its output in the cache 303. The query 322 is searched for on the Internet, i.e., a type of encapsulation of the information needed. It is derived from the information and metadata available at the home network. The web pages 326 comprise any web page on the Internet that is returned by the search engine as a result of a query.

When a query is sent to a search engine, the search engine returns a list of URLs that are relevant to that query. For each relevant URL, most search engines also return a small piece of text (snippet) from the corresponding web page. The text is either from the web page itself, or it could be taken from the meta tags of the web page. Different search engines have different techniques for generating these snippets. The main purpose of these snippets is to give the user a brief overview of what the web page is about. The snippet analyzer 328 takes the output search results of a search engine (e.g., 330) as one input and takes a query from the CF 305 as another input. The snippet analyzer 328 analyzes the snippets from the results, extracts terms that are relevant to the query from the snippets, and passes the extracted terms to the CF 305.

The document theme extractor (DTE) 308 receives query/contextual information from the CF 305 as one input, takes one or more web pages 326 from the search engine interface 324 as another input, and performs one or more of the following steps as guided by the contextual information:

Step 1: Extracting and selecting a list of terms that best summarize the themes of the documents returned as results by the search engine interface 324, and returning the list to the CF 305; and/or Step 2: Clustering the documents returned as results by the search engine interface 324, extracting and selecting a list of terms that best summarize the themes of each cluster, and returning the lists to the CF 305.

The scraper 331 takes the query from the CF 305 as an input and sends search query to a selected Internet site (e.g., 327). After the scraper 331 receives a query response from the Internet site, the scraper 331 extracts the desired URLs and/or data, and passes the results to the CF 305. Alternatively, instead of sending the query as a search query to an Internet site, the scraper 331 may just fetch data (web pages) from an Internet site using the query, and/or once the page is retrieved, it may use the query to extract the required information from it.

The user profile store 304 stores user profiles. Examples of the information contained in a user profile include user information, recent user activity history, historical user activity, user's access patterns, user interests, etc.

The user profile manager 335 builds and maintains the user profile store 304. The user profile manager 335 provides an interface for other modules to add, delete, access and modify the user profile store 304. The user profile manager 335 further takes input from the CF 305 for accessing or modifying the user profile store 304 and returns corresponding results to the CF 305.

The query execution planner 312 provides a plan including forming a query based on correlations identified between, e.g., the additional information, the contextual information and the user activity information. The correlation plan executor 314 executes the query plan and correlates the query plan execution results so as to deliver better results to the user.

The correlation constructor 316 either works with the execution planner 312 to form the query plan by correlating data gathered from external sources and the data gathered from the home network, or forms the plan automatically through the correlation. The Internet metadata gatherer from structured sources 318 gathers metadata about local content from Internet structured data sources 320.

Accordingly, the present invention augments a user's experience by providing relevant information to a user by data correlation while requiring minimal user input. By mapping UI functions to a small number of key presses the user can obtain or select relevant information with a few key presses. User interests based on past and present user activity in the network forms contextual information. The contextual information is used in forming search queries in performing contextual searches for information relevant to the user interest, and presents the results to the user. In one implementation, the metadata related to the local content and the current application states are used to obtain the contextual information for query formation and result filtering to suggest more relevant information, essentially without user intervention.

The CF 305 can also orchestrate contextual query refinement and contextual search by performing the following steps:

1. Invoking one or more of the components 302, 306, 310, 324, 328, 308, 318, and passing the relevant contextual information thereto for forming a query or a query plan, executing a plan, or examining the results returned by the above components.
2. Receiving a list of terms from any of the components 302, 306, 310, 324, 328, 308, 318 and making the following decisions:
   a. Whether the terms in the list should be further refined;
   b. Whether any of the terms in the list carry contextual information;
   c. Whether and how a new query should be formed using the contextual information and the old query; and
   d. Whether any of the contextual information should be used as context of a query.
3. If new contextual terms are found from a returned list, then using all or some of the terms, and optionally passing the terms to the LCIG 302 to store for future use.
4. If a new query should be formed, then constructing the query according to the decision made and executing the query.
5. If some of the contextual information should be used for context of a query, then using such information according to the predetermined format and executing the query.
6. If a returned list of terms needs to be further refined, then processing contextual information along with the list. Essentially, the list of terms is returned by components that retrieve related information from the Internet (i.e., one or more of components 308, 328, 324). The component 318 is not included because it retrieves fixed information from a fixed external resource.

As such, a CE device is configured according to an embodiment of the present invention, forms a query using contextual information about a user activity, user environment (e.g., home network) contents, and the metadata about such contents, and thus does not require the user to be involved in the search process. Further, users need not be skilled in query formation to obtain information from the Internet. Such a configured CE device uses the contextual information to select the most relevant results returned in response to the query for presentation to the user.

In the embodiment shown in FIG. 4, components 303 and 307 can reside on the local network, while components 320, 327 and 330 reside outside the local network. The components 304 and 309 can reside on the local network or the CE device, while the remaining components reside on the CE device on the network.

The present invention enables users to use a CE device for searching information while using a small number of keys without a keyboard. Users can obtain desired information on the Internet with no or minimum involvement in query construction. Further, the precision of the search results is improved wherein that most relevant information can be easily accessed using a resource-limited CE device. In addition, the present invention suggests information from the search results based on the contextual information, to further augment user experience in using CE devices without a keyboard.

As such, the present invention provides a contextual search and query refinement process for CE devices, whereby the cognitive load of query formation is relegated to the CE device itself, freeing the user to simply enjoy the content. Using the contextual information, the CE device not only forms queries to obtain search results with relevant information, but the CE device then uses that contextual information for search result filtering to suggest those search results that are of more interest to the user in relation to the contextual information.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of providing information to a user of a television on a local home network, comprising:
    receiving input from a user indicating that the user has pressed a key, indicating that the user has watched a movie on a television and is interested in a search for further information about the movie, the television being coupled with one or more other user devices in a local home network;
    in response to receiving said input from the user, performing a plurality of search operations including a first search operation, a second search operation and a third search operation, the plurality of search operations being performed sequentially without involving any other input from the user; and
    displaying information to the user based on results received in response to the third search operation;
    wherein the first search operation comprises:
        a first search for information on the one or more other user devices in the local home network based on characteristics of the movie, wherein the first search includes obtaining information from metadata stored on at least one of the one or more other user devices in the local home network; and
        receiving contextual information from the local home network in response to the first search, wherein the contextual information received from the local home network in response to the first search is based at least in part on the metadata;
    wherein the second search operation comprises:
        a second search of the Internet based on the contextual information received from the local home network in response to the first search and
        receiving results in response to the second search;
    wherein the third search operation comprises:
        a third search based on correlation data, wherein the correlation data indicates correlations between the contextual information received from the local network in response to the first search and the results received in response to the second search, and wherein the third search involves a search of the local home network and a search of an external network that is external to the local home network; and
    wherein displaying information to the user based on results received in response to the third search operation comprises:
        determining, without user intervention, a relevant portion of the results received in response to the third search operation; and
        displaying information to the user that is based on the relevant portion and not based on other portions of the results received in response to the third search operation.

2. A method of providing information to a user of a media playing device on a local home network, comprising:
    receiving input from a user indicating that the user is interested in a search for further information about media playing on a consumer electronic device, the consumer electronic device being a television or a music player, the media being a movie or music, the consumer electronic device being coupled with one or more other user devices in a local home network;
    in response to receiving said input from the user, performing a plurality of search operations including a first search operation, a second search operation and a third search operation, the plurality of search operations being performed sequentially without requiring any other input from the user; and
    displaying information to the user based on results received in response to the third search operation;
    wherein the first search operation comprises:
        a first search for information on the one or more other user devices in the local home network based on characteristics of the media, wherein the first search includes obtaining information from metadata stored on at least one of the one or more other user devices in the local home network; and
        receiving contextual information from the local home network in response to the first search, wherein the contextual information received from the local home network in response to the first search is based at least in part on the metadata;
    wherein the second search operation comprises:
        a second search of the Internet based on the contextual information received from the local home network in response to the first search; and
        receiving results in response to the second search;
    wherein the third search operation comprises:
        a third search based on correlation data, wherein the correlation data indicates correlations between the contextual information received from the local home network in response to the first search and the results received in response to the second search, and wherein the third search involves a search of the local home network and a search of an external network that is external to the local home network; and
    wherein displaying information to the user based on results received in response to the third search operation comprises:
        determining, without user intervention, a relevant portion of the results received in response to the third search operation; and
        displaying information to the user that is based on the relevant portion and not based on other portions of the results received in response to the third search operation.

3. A method as recited in claim 2, wherein:
    the consumer electronic device is a television;
    the media is a movie;
    the movie is generated using a broadcast stream;
    there is stream data embedded in the broadcast stream, the stream data being one selected from a group consisting of closed captions and subtitles;
    the first search operation involves obtaining information from the stream data;

the contextual information received from the local home network in response to the first search is based on the stream data;

said input indicates a pressing of a key by the user; and the plurality of search operations are performed in sequence and during the sequential performance of the search operations, no input is received from the user that indicates what the search operations should search for.

4. A method as recited in claim 2 wherein:
the consumer electronic device is a music player; and
the media is a song.

5. A method as recited in claim 4 wherein the second search operation further includes obtaining Compact Disc Database (CDDB) information over the Internet from the CDDB.

6. A method as recited in claim 4 wherein the song includes lyrics and wherein, during the first search operation, the lyrics of the song are pre-fetched from a source stored in the local home network.

7. A method as recited in claim 2 wherein the third search involves a search of the Internet.

8. A method as recited in claim 2 wherein:
one of the other devices in the local home network stores a profile of the user;
the first search operation includes obtaining information from the profile; and
the contextual information received from the local home network in response to the first search is based at least in part on the profile.

9. A method as recited in claim 2, further comprising:
receiving, in response to the third search, information related to a multiplicity of media products;
analyzing the local home network of the user to identify at least one media product that is in the multiplicity of media products and that is also already stored on the local home network; and
displaying references to a plurality of the multiplicity of media products that helps provide an option to the user to purchase the plurality of media products wherein the plurality of media products are all of the multiplicity of media products except for the at least one media product that is already stored on the local home network.

10. A method as recited in claim 2 wherein the input received from the user indicates that the user pressed a key and wherein no input is received from the user while the plurality of search operations is being performed.

11. A method as recited in claim 2 wherein the second search operation further includes:
during the second search, sending a query to a search engine on the Internet, the query being based on the contextual information received from the local home network in response to the first search;
in response to the query, receiving a plurality of Uniform Resource Locators (URLs) from the search engine and a corresponding plurality of web page snippets, each web snippet being a portion of all text found at a web page for the corresponding URL;
analyzing the web page snippets to determine relevant portions of the snippets; and
extracting relevant portions from the snippets wherein the third search operation is based on the extracted relevant portions.

12. A method as recited in claim 2 further comprising determining the correlations between the contextual information received from the local home network in response to the first search and the results received in response to the second search from the Internet.

13. A method as recited in claim 12 wherein:
the contextual information received from the local home network in response to the first search includes a name of a person that is associated with the media;
the results received in response to the second search of the Internet indicate a first set of one or more purchasable items that are associated with said person;
the determining of the correlations between the contextual information received from the local home network in response to the first search and the results received in response to the second search involves determining an organization that the person is a part of; and
the results received in response to the third search indicate a second set of one or more purchasable items that is associated with said organization and that is different from the first set of purchasable items; and
the information displayed to the user is based on both the first and second sets of purchasable items and provides an option to purchase one of the first and second sets of purchasable items.

14. A computing system for obtaining information for a user of a media playing device in a local home network, comprising:
at least one processor; and
at least one memory that stores computer readable instructions, which when executed by the computing system cause the computing system to:
receive input from a user indicating that the user is interested in a search for further information about media playing on a consumer electronic device, the consumer electronic device being a television or a music player, the media being a movie or music, the consumer electronic device being coupled with one or more other user devices in a local home network;
in response to receiving said input from the user, perform a plurality of search operations including a first search operation, a second search operation and a third search operation, the plurality of search operations being performed sequentially without requiring any other input from the user; and
display information to the user based on results received in response to the third search operation;
wherein the first search operation comprises:
a first search for information on the one or more other user devices in the local home network based on characteristics of the media, wherein the first search includes obtaining information from metadata stored on at least one of the one or more other user devices in the local home network; and
receiving contextual information from the local home network in response to the first search, wherein the contextual information received from the local home network is based at least in part on the metadata;
wherein the second search operation comprises:
a second search of the Internet based on the contextual information received from the local home network in response to the first search; and
receiving results in response to the second search;
wherein the third search operation comprises:
a third search based on correlation data, wherein the correlation data indicates correlations between the contextual information received in response to the first search and the results received in response to the second search, and wherein the third search involves a search of the local home network and a search of an external network that is external to the local home network; and wherein the display of information to the user based on the results received in response to the third search operation comprises:
  determining, without user intervention, a relevant portion of the results received in response to the third search operation; and
  displaying information to the user that is based on the relevant portion and not based on other portions of the results received in response to the third search operation.

15. A computing system as recited in claim 14 wherein:
the consumer electronic device is a television;
the media is a movie;
the movie is generated using a broadcast stream;
there is stream data embedded in the broadcast stream, the stream data being one selected from a group consisting of closed captions and subtitles;
the first search operation involves obtaining information from the stream data; and
the contextual information obtained from local home network is based on the stream data.

16. A computing system as recited in claim 14 wherein:
the consumer electronic device is a music player; and
the media is a song.

17. A computing system as recited in claim 16 wherein the second search operation further includes obtaining Compact Disc Database (CDDB) information over the Internet from the CDDB.

18. A computing system as recited in claim 16 wherein the song includes lyrics and wherein, during the first search operation, the lyrics of the song are pre-fetched from a source stored in the local home network.

19. A computing system as recited in claim 14 wherein the third search involves a search of the Internet.

20. A computing system as recited in claim 14 wherein:
one of the other devices in the local home network stores a profile of the user;
the first search operation includes obtaining information from the profile; and
the contextual information received from the local home network in response to the first search is based at least in part on the profile.

21. A computing system as recited in claim 14 wherein the computer readable instructions, when executed by the computing system, further cause the computing system to:
  receive, in response to the third search, information related to a multiplicity of media products;
  analyze the local home network of the user to identify at least one media product that is in the multiplicity of media products and that is also already stored on the local home network; and
  display references to a plurality of the multiplicity of media products that helps provide an option to the user to purchase the plurality of media products wherein the plurality of media products are all of the multiplicity of media products except for the at least one media product that is already stored on the local home network.

22. A computing system as recited in claim 14 wherein the input received from the user indicates that the user pressed a key and wherein no input is received from the user while the plurality of search operations is being performed.

23. A computing system as recited in claim 14 wherein the computer readable instructions, when executed by the computing system, further cause the computing system to:
  send, during the second search, a query to a search engine on the Internet, the query being based on the contextual information received from the local home network in response to the first search;
  receive, in response to the query, a plurality of Uniform Resource Locators (URLs) from the search engine and a corresponding plurality of web page snippets, each web snippet being a portion of all text found at a web page for the corresponding URL;
  analyze the web page snippets to determine relevant portions of the snippets; and
  extract relevant portions from the snippets wherein the third search operation is based on the extracted relevant portions.

24. A computing system as recited in claim 14 wherein the computer readable instructions, when executed by the computing system, further cause the computing system to determine the correlations between the contextual information received from the local home network in response to the first search and the results received in response to the second search from the Internet.

25. A computing system as recited in claim 24 wherein:
the contextual information received from the local home network in response to the first search includes a name of a person that is associated with the media;
the results received in response to the second search of the Internet indicate a first set of one or more purchasable items that are associated with said person;
the determination of the correlations between the contextual information received from the local home network in response to the first search and the results received in response to the second search involves determining an organization that the person is a part of; and
the results received in response to the third search indicate a second set of one or more purchasable items that is associated with said organization and that is different from the first set of purchasable items; and
the information displayed to the user is based on both the first and second sets of purchasable items and provides an option to purchase one of the first and second sets of purchasable items.

26. A non-transitory computer readable storage medium that includes executable computer code embodied in a tangible form operable to obtain information for a user of a media playing device in a local home network wherein the computer readable medium includes:
  executable computer code operable to receive input from a user indicating that the user who played media on a consumer electronic device is interested in a search for further information about the media, the consumer electronic device being a television or a music player, the media being a movie or music, the consumer electronic device being coupled with one or more other user devices in a local home network;
  executable computer code operable to perform, in response to receiving said input from the user, a plurality of search operations including a first search operation, a second search operation and a third search operation, the plurality of search operations being performed sequentially without requiring any other input from the user; and
  executable computer code operable to display information to the user based on results received in response to the third search operation;
  wherein the first search operation comprises:
    a first search for information on the one or more other user devices in the local home network based on characteristics of the media, wherein the first search includes obtaining information from metadata stored on at least one of the one or more other user devices in the local home network; and receiving contextual information from the local home network in response to the first search, wherein the contextual information received from the local home network in response to the first search is based at least in part on the metadata;

wherein the second search operation comprises:
a second search of the Internet based on the contextual information received from the local home network in response to the first search; and
receiving results in response to the second search;

wherein the third search operation comprises:
a third search based on correlation data, wherein the correlation data indicates correlations between the contextual information received from the local network in response to the first search and the results received in response to the second search, and wherein the third search involves a search of the local home network and a search of an external network that is external to the local home network; and wherein the display of information to the user based on the results received in response to the third search operation comprises:
determining, without user intervention, a relevant portion of the results received in response to the third search operation; and
displaying information to the user that is based on the relevant portion and not based on other portions of the results received in response to the third search operation.

27. A computer readable storage medium as recited in claim 26 wherein:
the consumer electronic device is a television;
the media is a movie;
the movie is generated using a broadcast stream;
there is stream data embedded in the broadcast stream, the stream data being one selected from a group consisting of closed captions and subtitles;
the first search operation involves obtaining information from the stream data; and
the contextual information received from the local home network in response to the first search is based on the stream data.

28. A computer readable storage medium as recited in claim 26 wherein:
the consumer electronic device is a music player; and
the media is a song.

29. A computer readable storage medium as recited in claim 28 wherein the second search operation further includes obtaining Compact Disc Database (CDDB) information over the Internet from the CDDB.

30. A computer readable storage medium as recited in claim 28 wherein the song includes lyrics and wherein, during the first search operation, the lyrics of the song are prefetched from a source stored in the local home network.

31. A computer readable storage medium as recited in claim 26 wherein the third search involves a search of the Internet.

32. A computer readable storage medium as recited in claim 26 wherein:
one of the other devices in the local home network stores a profile of the user;
the first search operation includes obtaining information from the profile; and
the contextual information received from the local home network is based at least in part on the profile.

33. A computer readable storage medium as recited in claim 26 further comprising:
executable computer code operable to receive, in response to the third search, information related to a multiplicity of media products;
executable computer code operable to analyze the local home network of the user to identify at least one media product that is in the multiplicity of media products and that is also already stored on the local home network; and
executable computer code operable to display references to a plurality of the multiplicity of media products that helps provide an option to the user to purchase the plurality of media products wherein the plurality of media products are all of the multiplicity of media products except for the at least one media product that is already stored on the local home network.

34. A computer readable storage medium as recited in claim 26 wherein the input received from the user indicates that the user pressed a key and wherein no input is received from the user while the plurality of search operations is being performed.

35. A computer readable storage medium as recited in claim 26 further comprising:
executable computer code operable to send, during the second search, a query to a search
engine on the Internet, the query being based on the contextual information received from the local home network in response to the first search;
executable computer code operable to receive, in response to the query, a plurality of Uniform Resource Locators (URLs) from the search engine and a corresponding plurality of web page snippets, each web snippet being a portion of all text found at a web page for the corresponding URL;
executable computer code operable to analyze the web page snippets to determine relevant portions of the snippets; and
executable computer code operable to extract relevant portions from the snippets wherein the third search operation is based on the extracted relevant portions.

36. A computer readable storage medium as recited in claim 26 further comprising executable computer code operable to determine the correlations between the contextual information received in response to the first search and the results received in response to the second search from the Internet.

37. A computer readable storage medium as recited in claim 36 wherein:
the contextual information received from the local home network in response to the first search includes a name of a person that is associated with the media;
the results received in response to the second search of the Internet indicate a first set of one or more purchasable items that are associated with said person;
the determination of the correlations between the contextual information received from the local home network in response to the first search and the results received in response to the second search involves determining an organization that the person is a part of; and
the results received in response to the third search indicate a second set of one or more purchasable items that is associated with said organization and that is different from the first set of purchasable items; and the information displayed to the user is based on both the first and second sets of purchasable items and provides an option to purchase one of the first and second sets of purchasable items.

\* \* \* \* \*